XR 3,488,437 CROSS REFERENCE SEARCH ROOM
TX 309 TT
VIDEO DISPLAY SYSTEMS
Filed Dec. 9, 1966 2 Sheets-Sheet 1
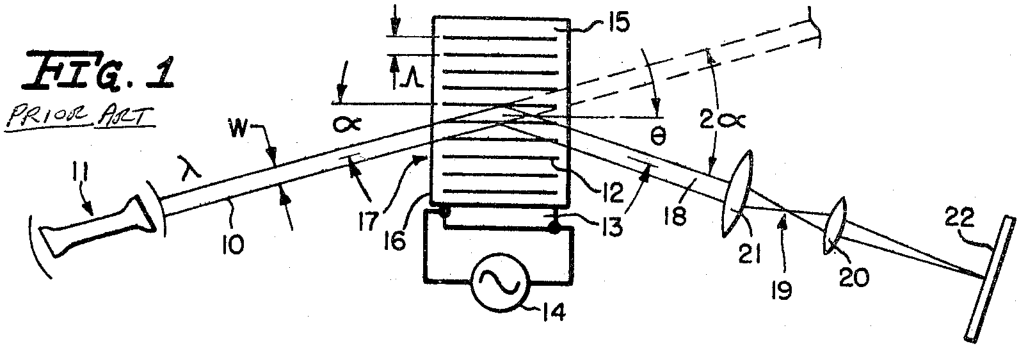
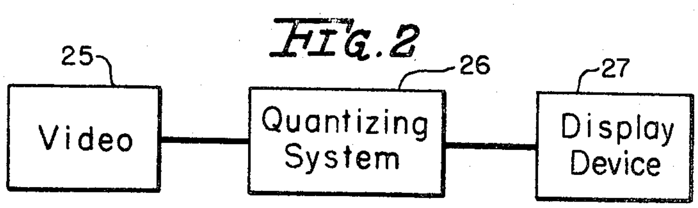
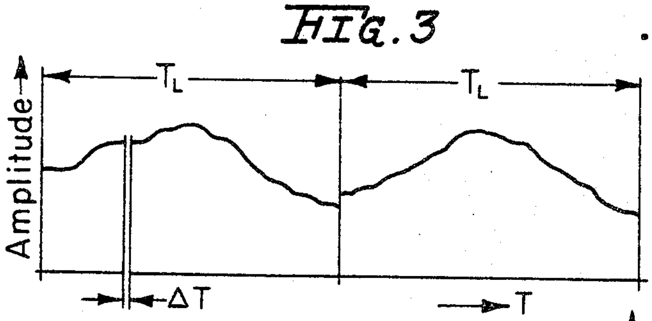
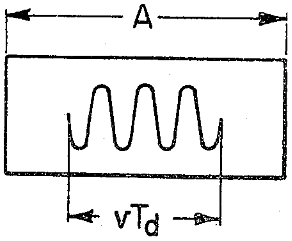
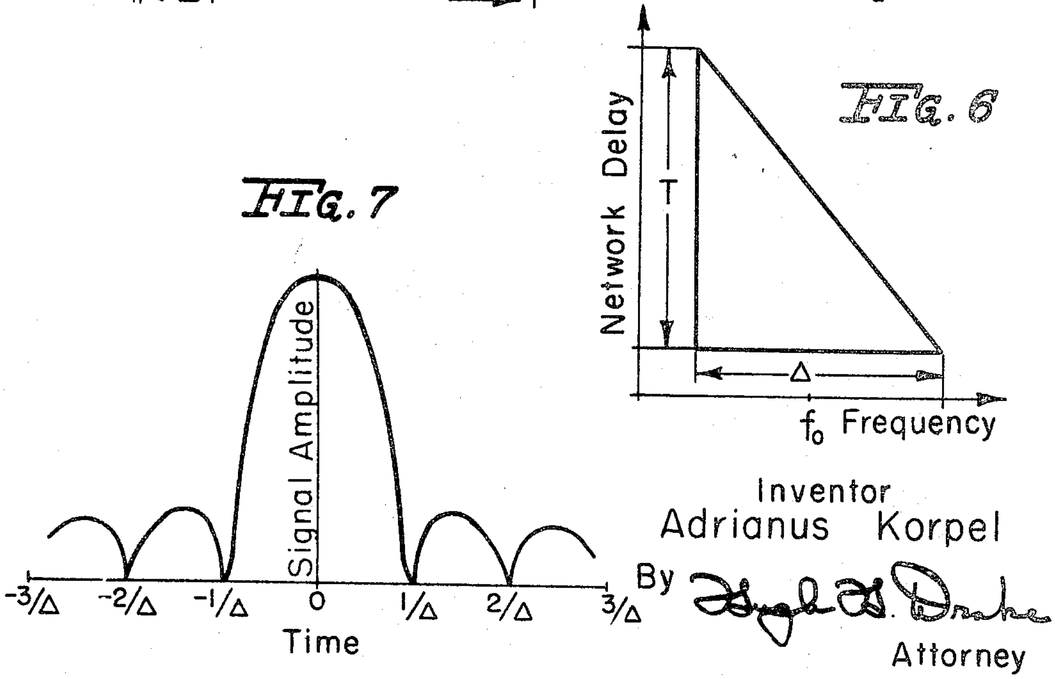
FIG. 6, FIG. 7
Inventor
Adrianus Korpel
By Hugh H. Drake
Attorney
3488437
NO OR CLASSIF Inventor
Adrianus Korpel
By Hugh H. Drake
Attorney United States Patent Office 3,488,437

Patented Jan. 6, 1970

3,488,437
VIDEO DISPLAY SYSTEMS
Adrianus Korpel, Prospect Heights, Ill., assignor to Zenith Radio Corporation, Chicago, Ill., a corporation of Delaware
Filed Dec. 9, 1966, Ser. No. 600,607
Int. Cl. H04n 5/00, 5/44
U.S. Cl. 178—7.5 4 Claims

ABSTRACT OF THE DISCLOSURE

Analog video signals are effectively quantized to develop a plurality of control signals of different frequencies representing different image elements. An image display device is provided in which sound waves are propagated across the path of a beam of monochromatic light in response to the plurality of control signals, as a result of which the light is diffracted along a plurality of different paths to thereby reproduce image elements on a display screen.

The present invention pertains to display systems. More particularly, it relates to display systems which depict elements at selected positions determined in accordance with the frequency of control signals and to apparatus for processing signal information to develop those control signals.

One conventional image display system is the present-day television receiver. That receiver utilizes a cathode-ray tube in which an electron beam is caused to sweep horizontally and vertically to define an image raster, while the beam intensity is modulated in amplitude to control the image brightness at any instantaneous position of the beam on the raster. Consequently, an individual picture element in the display is located by the amplitude and timing of the scanning signals, while the brightness of that picture element is determined by the amplitude of the video signal instantaneously when the electron beam is located at the position of the picture element. That is, the entire information which defines the picture element is delivered simultaneously, and the energy which governs the brightness of the picture element must be delivered to the picture element in the very short time interval during which the electron beam is in a position on the picture element. Of course, in the conventional cathode-ray tube the picture element is generated by a phosphor in response to impingement of the electrons.

Numerous other devices such as panels of electroluminescent cells have been proposed to produce image displays. In general with respect to various different ones of such display systems, the incoming information is of a time sequential character and the manner of addressing the display device correspondingly is of time sequential type. Consequently, the entire energy for developing a picture element at any particular time-determined position must be delivered during the time interval corresponding to that position. This places a heavy burden both upon the necessary characteristics of the display device and upon the requirements of the addressing apparatus.

It is therefore a general object of the present invention to provide a display system which overcomes the afore-noted limitations of prior systems.

Another object of the present invention is to provide a display system in which a display-information signal of time sequential character is converted to a signal of frequency multiplex character.

A further object of the present invention is to provide a new and improved display system utilizing a display device which is addressed as to picture element position in terms of frequency of the addressing signals.

A display system in accordance with one aspect of the present invention includes a source of video signals the amplitude of which varies with change of time together with means for effectively quantizing that video signal to develop a plurality of control signals the individual frequencies of which represent different times within the aforesaid change of time. Additionally included in the system is an image display device responsive to the control signals for developing image elements at positions determined by the control signal frequencies. The invention also resides in a frequency-addressed display system.

The features of the present invention which are believed to be novel are set forth with particularity in the appended claims. The invention, together with further objects and advantages thereof, may best be understood, however, by reference to the following description taken in connection with the accompanying drawings in the several figures of which like referenec numerals indicate like elements and in which:

FIGURE 1 is a schematic diagram of one known form of image display device suitable for use in a system incorporating the principles of the present invention;

FIGURE 2 is a block diagram of a display system incorporating principles of the present invention;

FIGURE 3 is a biaxial representation of successive periods of a video signal;

FIGURE 4 depicts the waveform of a signal developed in the system of FIGURE 1;

Figure 5A:
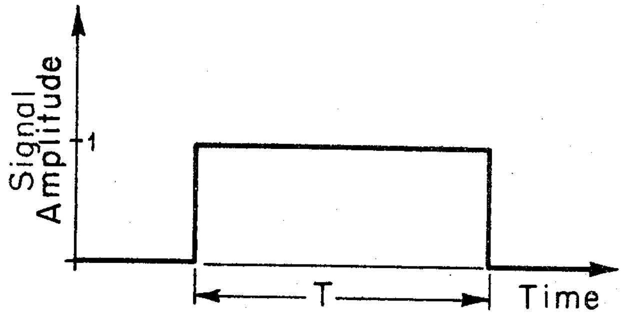
Figure 5B:
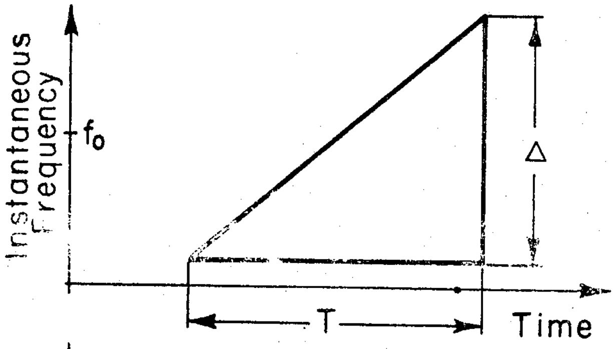
Figure 5C:
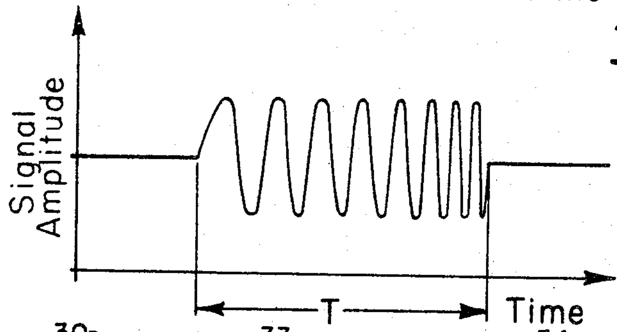
Figure 8:
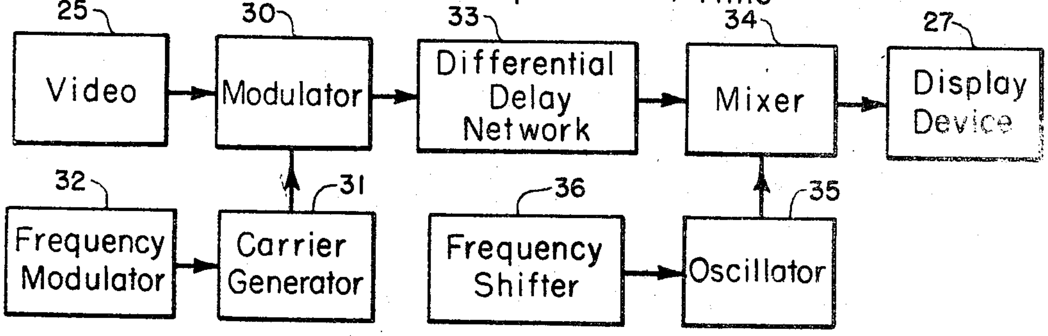

FIGURES 5*a*–5*c* are biaxial representations of the characteristic of a network included in one embodiment of the present invention;

FIGURE 6 is a biaxial representation of the characteristic of a network included in one embodiment of the present invention;

FIGURE 7 is a biaxial representation of a response curve of a signal developed by a network having the characteristics of FIGURE 6; and FIGURE 8 is a block diagram of a complete display system in accordance with one embodiment of the present invention.

FIGURE 1, as first considered herein, illustrates certain principal elements in a known imaged display system for which a more detailed description may be found in the copending applications of Robert Adler filed Aug. 3, 1965, Ser. Nos. 476,797 and 476,873, the latter having issued as U.S. Patent 3,373,380, on Mar. 12, 1968, both assigned to the same assignee as the present application. However, FIGURE 1 depicts only those elements of the prior system which are utilized to cause a beam of light to interact with sound waves in a manner such that the light beam is caused to scan across an image plane. As utilized herein and in those applications the term "light" includes radiation in both the visible and invisible portions of the spectrum and the term "sound" refers to acoustic-type energy of wavelengths both in the audible and super-audible ranges.

In FIGURE 1, a beam 10 of light is produced by a laser 11, the light having a wavelength $\lambda$ and a width W. Propagating across the path of beam 10 are a series of sound waves 12 launched by a transducer 13 driven by a signal source 14. The sound waves, of wavelength $\Lambda$, in a typical embodiment propagate in a medium 15 such as water confined within an enclosure 16 having side walls transparent to the light in beam 10. The entire sound propagating assembly, here designated 17, has been frequently referred to as a sound cell.

When light beam 10 is incident upon the sound wavefronts approximately at the Bragg angle $\alpha$, a portion of the light beam emerging from cell 17 is diffracted along a path 18 forming an angle with the undiffracted beam portion of $2a$. Bragg angle $\alpha$ is determined in accordance with the relationship:

$$\sin a = \pm\lambda/2\Lambda \qquad (1)$$

In typical applications, the actual value of angle $\alpha$ is sufficiently small that the left term in Equation 1 is simply the angle $\alpha$ itself.

The diffracted light in beam 18 is projected by a telescope 19, having an eye piece 20 and an object lens 21, upon an image screen 22. As will be evident from an examination of Equation 1, the value of the diffraction angle is a function of the wavelength (or frequency) of the sound waves and hence is correspondingly a function of the frequency of the signals generated by source 14. As the sound wavelength decreases the diffraction or deflection angle increases. Consequently, by scanning the sound frequency repeatedly through a given frequency range, returning the sound frequency value to its beginning value at the end of each scansion, the light beam is caused to repeatedly scan across image screen 22. Utilizing this approach and intensity modulating the light beam in accordance with the amplitude of a video signal causes the video information to be displayed in terms of light image elements spread out across screen 22 in a line.

In accordance with conventional television practice, the light beam scansion may be synchronized with the development of the video information by a television camera. Of course, to produce an actual television display in this manner, the system of FIGURE 1 also includes means for deflecting light beam 18 in a direction orthogonal to the scanning direction illustrated in FIGURE 1 so that a completed image raster is defined. However, for purposes of disclosing the essential elements of the present invention it is neccessary to consider in detail only the manner of display with respect to one of the two orthogonal directions.

In the systems of the Adler applications, the light beam emerging on path 18 is caused to scan an image raster in the manner just described. As the beam scans each line of the raster, its image contribution is divided up into a succession of picture elements, fully analogous to the development of picture elements in a line of a cathode-ray tube television display. The number of picture elements of the system is a function of the overall resolution of the system, a greater number of picture elements in a given line resulting in correspondingly greater detail being presented by the resulting image. The brightness of each element or group of elements relative to the next is the function of the video signal information introduced into the system and results in the changes of shading across the displayed image which together constitute the ultimate picture.

In the Adler systems, such changes in brightness from one picture element to the next are caused by intensity modulation of the light beam. To this end, a light-amplitude modulator is disposed in beam path 10 between laser 11 and cell 17. In typical ones of those systems, this modulator takes the form of another sound cell in which the sound waves likewise are propagated across the light beam. In that case, the sound waves are produced by a signal source of constant carrier frequency with the carrier being amplitude modulated by the video information. Since the carrier frequency remains constant, the angle of diffraction of the beam by the modulation sound cell is constant, but the intensity of the light emerging from the sound cell is modulated as a function of the modulation on the carrier frequency. Consequently, as beam 18 is caused to scan screen 22 in such systems, the intensity of the light in the beam varies along the scanning lines in accordance with the time-synchronized variations in the amplitude of the input video signal.

Numerous modfications and refinements of the Adler approach are described in a number of different applications assigned to the same assignee as the pressent application. In most of these systems, the development of each picture element occurs entirely during a very short time interval when the scanned light beam is located at the position of that picture element. In seeking to increase the time interval during which each picture element is turned on, the present invention employs techniques which, of course, depart from these prior systems, while at the same time it may utilize and take advantage of a number of features of the prior systems.

While the apparatus depicted in FIGURE 1 represents but one of a variety of image display mechanisms which may be incorporated into an overall system in accordance with certain aspects of the present invention, it is incorporated herein because of its simplicity and the fact that, as such, its basic mode of operation is now rather well understood in the art. A particular characteristic of the FIGURE 1 apparatus, which it shares with other display mechanisms utilizable with image processing techniques disclosed hereafter, is that the position on screen 22 of picture elements being addressed at any given time is a function of the frequency of an applied signal.

For one particular angle of diffraction $\alpha$, between emerging light beam 18 and the plane of the sound wavefronts, the light beam impinges upon screen 22 at a nominal or center position as illustrated. This position corresponds to a particular frequency of the sound. At this position, the diffracted light also is of a given intensity, and hence the brillance of the spot formed on screen 22 is likewise of a given intensity, determined by the amplitude of the sound signal and thus upon the intensity of the sound waves in cell 17 by which the light is diffracted. If, then, the frequency of the sound signal from source 14 is increased so that the sound wavelength is decreased, the exit angle $\alpha$ is likewise increased so that the spot formed on screen 22 is moved to a position toward the lower end of screen 22 in FIGURE 1. Again, the intensity of this new spot is a function of the amplitude of the sound signals of this new frequency.

Now, if source 14 simultaneously develops two signals individually of different frequency and amplitude, cell 17 will correspondingly deflect two light beams at respective angles $\alpha_1$ and $\alpha_2$ which in turn develop corresponding spots spaced along screen 22 in the direction of the scanning line. The two spots will individually have respective amplitudes corresponding to the respective amplitudes of the two signals applied from source 14. Up to a maximum limit determined by the resolution N of the system, the number of signals simultaneously developed by source 14 may be increased to any number as a result of which cell 17 diffracts a corresponding plurality of beams to produce a like plurality of spots distributed across screen 22. Each of the spots has an intensity or a brightness corresponding to the amplitude of its respective signal produced by source 14.

Thus, in accordance with one aspect of the present invention a plurality of signals, differing in frequency and individually representative of position and the amplitude of a corresponding plurality of video picture elements, are utilized to launch respective sound waves simultaneously across a light beam in order to cause diffraction of the light. The corresponding plurality of diffracted beams simultaneously produce an entire image line of picture elements, or at least a significant portion of what is an entire line of picture elements. A generally similar system oriented to move the light beams in the orthogonal direction may be employed to effect scanning of a complete image raster. However, by virtue of the comparatively slow vertical scanning ray in present-day television systems, the system of FIGURE 1 has been used for the higher-rate horizontal deflection and a simple galvanometer-controlled mirror has been employed to accomplish the vertical deflection.

In one overall television system in which the apparatus as thus far described may be employed, image pick-up or camera apparatus is employed which generates directly a pattern of electrical signals in which individual signal frequencies correspond to position on the image to be televised and the amplitude of those image signals represents the intensity of each such picture element. However, the present system is also applicable, in accordance with the present invention, to use with present-day received television signals.

In the development of present-day video signals, an image is scanned one horizontal line at a time and a signal of constant frequency is caused to vary in amplitude throughout the line-scanning time interval in accordance with the changes in image brightness across the scanned line during that interval. That is, the camera, or the video amplifier in a television receiver which redevelops the camera signal, constitutes a source of signals the amplitude of which change in time.

The system depicted in FIGURE 2 includes such a source 25 of video signals. Responding to those video signals is a quantizing system 26 which develops a plurality of control signals the individual frequencies of which differ with difference in time to present corresponding different image points or picture elements. The amplitude of each control signal represents the amplitude of the video signal at its image element position. Coupled in turn to quantizing system 26 is a display device 27 which is responsive to the control signals for developing image elements at positions determined by the respective control-signal frequencies and of intensities determined by the respective amplitude of the control signals. As explained above, the system of FIGURE 1 is representative of one form of such a display device. Preferably, the control signals are stored as they are developed and then those representing an entire scanning line, or a substantial portion thereof, are simultaneously delivered for a substantial time period.

Video source 25 develops a signal pattern of the form shown in FIGURE 3. In that figure, the video signal amplitude changes are shown throughout a scanning line period $T_L$ for each of two successive such scanning periods. The waveforms depicted in FIGURE 3 represent the image line over which the changes in brightness occur rather gradually with a peak amplitude occurring near the center of the image line.

The television signal represented in FIGURE 3 is of a time-sequential character. It is contemplated in accordance with the present invention to convert that signal to one of a frequency multiplex character. To this end, system 26 is utilized to quantize the FIGURE 3 signal into a plurality of successive steps $\Delta T$ each equal to the quantity $T_L/N$, where N is the number of resolvable points corresponding to the highest modulation frequency present in the video signal. For illustration, with the number of points N being 480 and with a period $T_L$ of 60 microseconds, the quantizing time $\Delta T$ is approximately ⅛ of the microsecond. Consequently, the image line shown in the first half of FIGURE 1 may be thought of as consisting of examples of amplitude $E_n$ individually taken at a time $t=n\Delta T$ $(n=1\rightarrow N)$. The second line is of samples at time $t=(n+N)\Delta T$. Samples $n$ and $n+kN$ will be vertically corresponding. Of course, $n$ represents a series of integers assigned to the successive samples across the line and $k$ corresponds to the individual numbers of successively developed lines.

In order to frequency-address a display device with respect to picture element position, each of the samples $E_n$ is assigned a frequency $f_0+n\delta f$. After a suitable delay for each sample, at time $T_L$ at the end of the scanning period, quantizing system 26 generates a plurality of carriers $f_0+n\delta f$ with amplitude $E_n$ for all of the points on the first image line. That is, all of the different frequencies $f_0+n\delta f$ start at the same time $T_L$, each with its own amplitude $E_n$. These carriers are generated for a period $T_L$; for example, they are generated for the period from $t=T_L$ to $t=2T_L$. While that composite carrier is being generated, system 26 samples all of the points on the next line so that points $E_{N+n}$ are each again assigned a carrier frequency $f_0+n\delta f$. This composite group of carriers is then generated during the period from $t=2T_L$ to $t=3T_L$. Thus, as each successive line is quantized, for samples from the previous line are being generated.

With a display device such as the system of FIGURE 1, each point on the line is addressed by a frequency characteristic of its location. Thus, the $n$'th point is addressed by the signal $f_0+n\delta f$. Preferably, the entire line is displayed simultaneously for the time $T_L$. Thus, the scanning in the orthogonal direction may be comparatively slow and the control of that function may be obtained, in general, by changing the value of the fundamental carrier frequency $f_0$ by a courser amount, greater than the maximum $n\delta f$, in appropriate steps corresponding to the succession of lines.

Whatever particular kind of display device is utilized for responding to this type of signal information, it is apparent that the quantity $\delta f$ must be such that the display can discriminate between neighboring points. Since the device has at time $T_L$ in which to do this, it follows that:

$$\delta f \geq 1/T_L = 1/N\Delta T \tag{2}$$

Hence, the total frequency span $\Delta F$ is represented by the equation:

$$\Delta F = N\delta f \geq N/T_L = 1/\Delta T \tag{3}$$

It may be noted that the required bandwidth is the same as that for present-day conventional television systems.

In the foregoing discussion, it was assumed that all of the picture element carriers were generated simultaneously at times $T_L$, $2T_L$ and so forth. While this is not a necessary condition, it may be ideal in the sense that it tends to simplify the vertical addressing system in the orthogonal direction. As noted, the vertical addressing may be accomplished very simply by use of a continuously moving mirror. Consequently, with simultaneous carrier generation the first image line is caused by the vertical mirror to blend gradually into the second while yet staying perfectly horizontal. If, on the other hand, the picture element carriers were generated instantaneously (i.e., at times $n\Delta T$, $(n+N)\Delta T$, etc.), the lines would be skewed in a sense that the first point of the second line would be at the same height as the last point in the first line; this would be more analogous to conventional cathode-ray tube image scanning.

A primary advantage of the image display approach under discussion is that the delivery of the picture element information may be spread out over the total line trace interval $T_L$ rather than just over the time $\Delta T$. This means that the peak brightness of the display can be reduced by the resolution factor N. Of course, this is extremely important in a case where there is a limitation on peak brightness such as in electroluminescent display devices or in apparatus in which the human eye response may become saturated. In any case, a given picture element developed by the present system may be caused to persist for a time interval much longer than that corresponding to the on-time of a picture element in a system where the picture element is developed only as a beam sweeps past the position of the element.

Even where, in a given apparatus, the individual picture element carriers cannot reasonably persist for the entire trace time $T_L$, a proportionate degree of benefit is obtained for any amount of time dispersion $T_d$ between $\Delta T$ and $T_L$. In this case, the criterion on quantity $\delta f$ is now different:

$$\delta f \geq 1/T_d = 1/N_d\Delta T \tag{4}$$

Correspondingly, $$\Delta F > N\delta f = N/N_d 1/\Delta T \tag{5}$$

where $N_d$ is less than N and represents a dispersion factor. In the limiting case, of course, $N_d=1$ and $$\delta f \geq 1/\Delta T \Delta F \geqslant N/\Delta T \qquad (6)$$

In that limit case, nothing is gained in brightness requirements although the addressing system still may be simplified as compared with present systems inasmuch as it uses frequency, rather than time, discrimination.

Referring again to FIGURE 1, the diffraction angle $\alpha$ is equal to $\gamma/\Lambda$ which is also represented by the quantity $\gamma f/v$, where $f$ is the sound frequency and $v$ is the sound velocity. At the same time, the light has a diffraction spread which is equal to the quantity $\gamma/W$, where W is the actual or effective width of the light beam. Consequently, the smallest resolvable frequency difference $\delta f$ equals $v/W$ which in turn is equal to $1/\tau$, where $\tau$ is the time it takes the sound to travel the distance W. The effective aperture width W may be established by any of the width of the light beam, the width of a physical light-transparent aperture in the walls of cell 17 or the length of the sound pulse developed by the picture element carrier.

Of particular interest in the display system of FIGURE 1 is the transit time parameter $\tau$. Assuming that $\tau$ determined by the duration of the sound pulse ($\tau = T_d$) and that the physical aperture width A is greater than the quantity $vT_d$, the sound signal present within the aperture is represented schematically in FIGURE 4. In this situation, as in the above discussion, the quantity $\delta f$ is greater than or equal to $1/T_d$, but the corresponding image point is effectively "on" for a time $A/v$, the time it takes a pulse to traverse the aperture. On the other hand, if the transit time $\tau$ is determined by the aperture width A, the conditions on $\delta f$ are such that $\delta f$ is greater than $v/A$ but the image point is "on" for a time $T_d$. In either case, it is to be noted that the required frequency span $\Delta F$ can be reduced considerably by increasing the simultaneous picture-element-duration $T_d$.

For example, assuming a frequency span $\Delta F$ of approximately 16 megahertz so that for a resolution of 480 the quantity $\delta f$ is approximately $3.33 \times 10^4$ Hertz. $T_d$ is greater than 30 microseconds with a dispersion factor $N_d$ greater than 250. Similarly, with a dispersion factor of 125, a frequency span $\Delta F$ of 30 megahertz is required and the resulting value of $T_d$ is approximately 16 microseconds. It should be noted in passing that additional diffraction takes place at the edges of any aperture in cell 17 where, so far as the light is concerned, the sound pulse appears and disappears. Degradation from this effect must, of course, be taken into account to obtain theoretical performance.

In order to process the electrical signals exhibiting the characteristics described above with respect to the action of quantizing system 26, advantage is taken of certain elements discussed in detail in an article entitled "The Theory and Design of Chirp Radars" by Klauder et al. which appeared in the Bell System Technical Journal, vol. XXXIX, No. 4, July 1960. In the discussion that follows, the nomenclature utilized in that article will first be employed herein to explain the desired functions, after which the necessary transposition of symbols to adapt the elements to the foregoing discussion will be given.

In terms of information available in a given system, it can be shown that a long pulse of constant carrier frequency contains a narrow bandwidth and, therefore, possesses poor resolution properties. On the other hand, a short pulse of comparatively large-frequency content or bandwidth has high resolution capabilities. To increase the spectrum of the long pulse, frequency modulation is introduced so that, in effect, the frequency characteristic of the short pulse is introduced within the envelope of a long-duration signal. Generally speaking, the potentials of such a frequency modulated pulse are realized by incorporating a suitable phase equalization network in the receiving components of the system.

FIGURE 5*a* depicts a single signal pulse having unity amplitude and a time duration T. At the same time, the signal is linearly modulated in frequency as represented in FIGURE 5*b*. During the time T, the instantaneous frequency linearly increases; that is, a band of frequencies $\Delta$, centered at $f_o$, is linearly swept during the pulse duration. A schematic diagram of the resulting signal is represented in FIGURE 5*c* where, during the time duration T, the signal has a peak-to-peak amplitude of two and has a linearly increasing instantaneous frequency.

The resulting signal is then fed to a differential delay network having the characteristic exhibited in FIGURE 6. Over the frequency band $\Delta$ the delay varies linearly and changes by the amount T from the beginning to the end of the frequency sweep. Consequently, the signals developed at the beginning of the period T are so delayed that they emerge from the differential delay network simultaneously with the signals developed at the very end of the time period T. Similarly, the signals instantaneously developed at all times throughout the time interval T emerge from the delay network simultaneously.

The resulting amplitude response of the signal output from the delay network is depicted in FIGURE 7. It is composed of a primary pulse having a width of about $1/\Delta$ and exhibits an amplitude increase over the unity value of FIGURE 5*a* of $\sqrt{D}$, where $D = T\Delta$ and is called the dispersion factor. The response envelope represented in FIGURE 7 is derived analytically by the absolute value of the quantity $\sqrt{D}[(\sin \pi \Delta t/(\pi \Delta t)]$ where $t$ is the instantaneous time. As a result of this processing, the pulse width T is collapsed to a value $\tau$ by the order of $1/\Delta$. The amount of pulse width reduction is given by $$T/\tau \cong T\Delta = D \qquad (7)$$

Useful systems of the kind proposed in the aforementioned article possess dispersion factors of 100 and more.

As developed more fully in the article, a number of techniques are available for the construction of the differential delay network and for the generation of a signal having the properties illustrated in FIGURES 5*a*–5*c*. For example, an active generation technique involves modulation by use of a voltage tunable device such as a Klystron. A passive generation scheme relies upon the use of another network that performs the inverse operation of the network depicted in FIGURE 6; that is, it is a differential delay network having a slope in the opposite direction and it develops a long frequency-modulated output pulse from a very short input pulse. Other ramifications and further detailed analysis, unnecessary to complete an understanding of the present invention, are discussed in the article.

The instantaneous frequency $f$ of the signal depicted in FIGURE 5*c* is defined by the equation:

$$f = f_o + kt \text{ and } kT = \Delta \qquad (8)$$

The analysis assumes that the rectangular envelope in FIGURE 5*a* is centered at $t=0$. A network having the characteristic of FIGURE 6 exhibits a parabolic phase characteristic $$\psi = \pi(f - f_o)^2/k. \qquad (9)$$

This will be seen to imply a linear time delay $$t_d = -\tfrac{1}{2}\pi d\psi/df = -1/k(f - f_o) \qquad (10)$$

Consequently, the differential delay over the frequency band $\Delta$ expressed by the relationship $t_d = \Delta/k = T$.

At shown in FIGURE 7, the original pulse of FIGURE 5*a* is changed by the delay network to an output pulse which has a typical sin $x/x$ envelope. This output pulse is a signal modulated on a carrier which itself is linearly modulated in frequency but with the opposite slope of FIGURE 6 so that its frequency $f = f_o - kt$. It may be noted that if the product $T\Delta$ is larger than unity, the output pulse is shorter than the input pulse; if $T\Delta$ is smaller than unity, the reverse is true.

Of particular interest with respect to the utilization of such a technique is that which happens to a similar signal having an envelope centered at $t=-t_0$ on the same carrier of frequency $f=f_0+kt$. The average frequency of this pulse is of the value $f_0-kt_0$ and it can easily be shown that the envelope is delayed by $t_0$ to coincide with the later pulse at $t=0$. At the same time, the carrier of the output pulse is given by the relationship $f=(f_0-kt_0)-kt$. Thus, at any particular time the instantaneous frequency of this carrier is less by the quantity $kt_0$ than the pulse appearing at $t=0$. This difference is exactly the same as the difference between the average frequencies of the incoming pulses at $t=0$ and $t=-t_0$. Accordingly, by mixing both carriers with a local oscillator which also is linearly frequency modulated with the same slope $k$, the product is two constant-frequency carriers differing in frequency by $kt_0$. These relationships are those desired for use in system 26 of FIGURE 2. To return, then, to the discussion of the system of FIGURE 2, the relationships developed with respect to the nomenclature in the article are simply changed by substituting $\Delta T$ for $t_0$, replacing $\Delta$ by the quantity $\Delta F$ and substituting $T_d$ for $1/\Delta$. This means, then, that the picture information from throughout an entire line $T_L$ (FIGURE 1), or a portion thereof $T_d$, may be compressed into a pulse simultaneously containing all that information.

The resulting network is depicted diagrammatically in FIGURE 8. In this figure, video amplifier 25 feeds a video signal to a frequency modulator 30 where it is modulated upon a carrier developed by a carrier generator 31 which in turn is linearly modulated in frequency by a frequency modulator 32. The resulting signal from modulator 30 is fed through a differential delay network 33 to a mixer 34 where it is combined with a local-oscillation signal from oscillator 35 also modulated linearly in frequency by a frequency shifter 36. The product signal developed in mixer 34 is fed to display device 27.

To illustrate with respect to a typical TV system, each line of the video or picture signal is modulated onto the carrier from generator 31 which is modulated in frequency between $f_0$ and $f_0+8$ megahertz. The latter frequency appears approximately 60 microseconds after the first one and is at the end of the scanning line. Thus, the two are separated in time by the period $T_L$. Correspondingly, delay network 33 exhibits a differential delay time of 60 microseconds linearly spread across the 8 megahertz band. Consequently, each picture element has a frequency span $\delta f$ which equals $\frac{1}{60}$ megahertz and is effectively smeared out by network 33 so as to have an effective width of $1/\delta f$ or 60 microseconds. The signal output from network 33 is mixed with the local oscillator signal which changes linearly in frequency from a frequency of $f_1$ to another frequency $f_1-8$ megahertz after the 60 microsecond time period. The resulting difference signal from mixer 34 thus consists of frequencies $$(f_1-f_0)+n\tfrac{1}{60}, \qquad (11)$$

each value of $n$ then representing a picture element. This processed signal from mixer 34 is then fed to a frequency-addressed display device such as the apparatus in FIGURE 1.

The exemplary system just discussed represents a case where the duration of each image element is effectively expanded to cover the time period of an entire scanning line. As noted above, substantial benefits are obtained even when the element duration is substantially less than a full scanning line. Moreover, it is not necessary in all cases to use a linearly modulated frequency carrier for the ingoing video signal. The signal instead may be modulated on a fixed carrier $f_0$. The duration of the output signal samples, then, is equal to the total differential time delay in the filter across a band $1/\Delta T$. With this approach, however, the respective envelopes corresponding to the samples $\Delta T$ no longer emerged simultaneously from the delay network and this renders it somewhat more difficult to accomplish the multiplying process by means of mixer 34.

The described system enables the development of a given picture element in an image display for a sustained period of time, even in a display arrangement where the picture element is analyzed and originally generated in a much shorter time interval. That is, where the image analysis is in accordance with a time sequential process, the picture element display of the invention is at least semi-continuous in terms of time. The system here disclosed enables the use of a display device addressed by frequency in terms of position of picture elements. Also, a display system has been described which permits the reproduction of pictures analyzed in terms of frequency addressing rather than time-sequential addressing. Furthermore, a system has been described for converting video information from that of time-sequential character to that of frequency multiplex character.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A display system comprising:
a source of video signal the amplitude of which varies with change in time;
means for effectively quantizing said video signal to develop a plurality of control signals the individual frequencies of which represent different times within said change of time, said means including means for generating a frequency-modulated carrier upon which said video signal is modulated;
and an image display device responsive to said control signals for developing image elements at positions determined by said frequencies.

2. A system as defined in claim 10 in which said differentially delayed signal is mixed with a local oscillator signal to develop said control signals.

3. A system as defined in claim 2 in which said differentially delayed signal is mixed with a local oscillator signal to develop said control signals.

4. A system as defined in claim 2 in which said local oscillator signal is frequency modulated.

References Cited

UNITED STATES PATENTS

| | | | |
|---|---|---|---|
| 2,155,659 | 4/1939 | Jeffree | 350—161 |
| 2,797,619 | 7/1957 | Rosenthal. | |
| 3,055,258 | 9/1962 | Hurvitz | 350—161 XR |
| 3,324,478 | 6/1967 | Jacobs | 346—108 |
| 3,397,605 | 8/1968 | Brueggemann | 88—1 |

ROBERT L. GRIFFIN, Primary Examiner

ROBERT L. RICHARDSON, Assistant Examiner

U.S. Cl. X.R.

350—161

PO-1050
(5/69)

UNITED STATES PATENT OFFICE
CERTIFICATE OF CORRECTION

Patent No. 3,488,437 Dated January 6, 1970

Inventor(s) Adrianus Korpel

It is certified that error appears in the above-identified patent and that said Letters Patent are hereby corrected as shown below:

In the claims, claim 2, column 10, line 45, cancel beginning with "10 in which said" to and including "signals" in column 10, line 47, and insert the following:

--1 which includes means responsive to the modulated video signal for delaying its components differentially with respect to frequency--

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents